United States Patent [19]
Jackson

[11] Patent Number: 5,294,307
[45] Date of Patent: Mar. 15, 1994

[54] INTEGRATED PROCESS FOR THE PRODUCTION OF ALKALI AND ALKALINE EARTH METAL CHLORATES AND CHLORINE DIOXIDE

[75] Inventor: John R. Jackson, Wilmington, N.C.

[73] Assignee: Huron Tech Corp, Delco, N.C.

[21] Appl. No.: 923,379

[22] Filed: Jul. 31, 1992

[51] Int. Cl.⁵ .............................................. C25B 1/26
[52] U.S. Cl. ...................................... 204/95; 423/55; 423/478
[58] Field of Search ...................... 204/95; 423/55, 478

[56] References Cited

U.S. PATENT DOCUMENTS

| | | | |
|---|---|---|---|
| 4,159,929 | 7/1979 | Grotheer | 204/95 |
| 4,175,038 | 11/1979 | Sakowski | 210/62 |
| 4,216,195 | 8/1980 | Jaszka et al. | 423/478 |
| 4,268,486 | 5/1981 | Noack et al. | 423/55 |
| 4,473,540 | 9/1984 | Fredette | 423/478 |
| 4,704,259 | 11/1987 | Lipsztajn | 423/55 |
| 4,804,528 | 2/1989 | Warren | 423/607 |
| 4,938,943 | 7/1990 | Norell | 423/478 |
| 5,211,853 | 5/1993 | Jackson et al. | 210/713 |

FOREIGN PATENT DOCUMENTS

| | | | |
|---|---|---|---|
| 1139080 | 1/1983 | Canada. | |
| 3032131 | 3/1981 | Fed. Rep. of Germany | 423/55 |
| 218495 | 1/1968 | Sweden | 423/55 |

Primary Examiner—Kathryn Gorgos
Attorney, Agent, or Firm—Andrew E. Pierce

[57] ABSTRACT

An integrated process for the production of alkali or alkaline earth metal chlorates and chlorine dioxide in which the chromium compound impurities in the alkali or alkaline earth metal chlorate aqueous solution produced by an electrochemical cell are removed and recycled to the electrochemical cell; a substantially chromium compound free alkali or alkaline earth metal chlorate is converted to chlorine dioxide and by-products; and the by-products are converted to substantially chlorine-free carbon dioxide, which is vented, and a dilute solution of an alkali or alkaline earth metal chlorate, which is recycled to the electrochemical cell.

20 Claims, 2 Drawing Sheets

INTEGRATED PROCESS FOR THE PRODUCTION OF ALKALI AND ALKALINE EARTH METAL CHLORATES AND CHLORINE DIOXIDE

BACKGROUND OF THE INVENTION

1. Field of the Invention

This invention relates to a process for producing chlorine dioxide by directly feeding to a chlorine dioxide generator an electrochemically produced aqueous solution of an alkali or alkaline earth metal chlorate substantially free of chromium values and the processing of waste gas streams produced during the production of chlorine dioxide to enable their use as feed solutions for an electrochemical cell for the production of an alkali or alkaline earth metal chlorate.

2. Description of the Prior Art

An aqueous solution of sodium chlorate and sodium chloride is conventionally produced by the electrolysis of aqueous sodium chloride in diaphragmless electrolytic cells. The extent of electrolysis is controlled to produce an effluent from the cell in which the sodium chlorate and sodium chloride have the desired ratio, usually in the range of about 1:1 to about 20:1 and preferably in the range of about 2:1 to about 15:1. The aqueous solution may be further processed to crystallize out the sodium chlorate for sale in crystal form for a variety of purposes. For example, in the wood pulp processing industry, chlorine dioxide which is used in the bleaching of chemical cellulosic pulps is prepared by reduction of aqueous sodium chlorate in the presence of a strong mineral acid, usually, sulfuric acid.

In the electrolysis of sodium chloride to form sodium chlorate, it is conventional to add chromates in the hexavalent state, usually in the form of sodium bichromate dihydrate, $Na_2Cr_2O_7.2H_2O$, to the electrolyte in the cell to improve significantly the current efficiency of the cell in the conversion of sodium chloride to sodium chlorate. The sodium chlorate containing cell effluent, also known as "cell liquor", therefore, generally contains significant amounts of chromate ions.

It is desirable to remove chromate ions from the cell effluent before employment of the same in chlorine dioxide generation especially in those processes in which methanol is used as a reducing agent in the reduction of chlorate to chlorine dioxide and it is desirable to recover chromate ion for reuse in the electrolytic cells. In addition, chromate ions are a toxic pollutant, so that environmental considerations require removal of the chromate ions where discharge of an effluent stream containing such ions may be effected. A number of prior proposals have been made for the removal of chromate ions from sodium chromate containing cell liquor.

Prior art methods for treating electroplating wastewater or other aqueous liquids containing hexavalent chromium ions as a contaminant are of interest. Electroplating wastewaters often bear heavy amounts of metal contaminates such as copper, cadmium, nickel, and chromium. While these heavy metals readily form hydroxides or sulfides, with the notable exception of chromium, the removal of chromium generally requires an additional treatment step to reduce the chromium ions from the hexavalent to the trivalent state prior to precipitation.

Among the chemicals used in the treatment of wastewater for reducing hexavalent chromium ions to the trivalent state, it is known to use ferrous sulfate, sodium bisulfite, sulfur dioxide, and sodium sulfide. While these chemicals work well as reactants for reducing the hexavalent chromium ions to the trivalent state, the quantity of sludge produced by each of these reactants can vary drastically. Since it is no longer sufficient merely to produce clean water, the volume of sludge produced for disposal is nearly as important as the effluent quality. It is known from U.S. Pat. No. 4,705,639 that in the disclosed sodium sulfide/ferrous sulfate treatment of wastewater for chromium ion reduction, the rate of chromium ion reduction depends upon the pH of the wastewater. In this process the electroplating wastewater is adjusted to a pH of about 8 to 10, treated with sodium sulfide and, thereafter, treated with ferrous sulfate or ferrous chloride to reduce the hexavalent chromium ions to the trivalent state. A process for the removal of hexavalent chromium ions from wastewater is also disclosed in U.S. Pat. No. 4,260,491 in which an aqueous composition containing hexavalent chromium ions and a chelating agent for trivalent chromium ions is treated at about pH 5 with both (1) a known reducing agent for converting hexavalent chromium ions to trivalent chromium ions and (2) with ferric or aluminum chloride or sulfate. This treatment is effective in producing a precipitate of chromic hydroxide upon raising the pH to about 7.5 to about 10.

In the processes discussed above for the removal of dichromates from electroplating baths and other metal treatment solutions, chloride ion is, typically, absent from such metal treatment solutions and, accordingly, very low levels of chromium ions can be obtained in the treated plating baths by reduction of the chromium ions contained therein from the hexavalent state to the trivalent state followed by the precipitation of the trivalent chromium ions as hydrated chromic oxide. The problem of achieving low levels of chromium ions in liquid solutions containing chloride ions is made more difficult by the fact that hydrated chromic oxide has a solubility product higher by a factor of $10^5$ when in the presence of chloride-containing solutions.

An aqueous solution of sodium chlorate, produced by the electrolysis of sodium chloride and prepared as a feed for a chlorine dioxide generator of the Rapson R-2 or R3/SVP process type, generally, has a chloride content of about 200 grams per liter. This level of salt content has not proved disadvantageous in these chlorine dioxide generators. However, the R8 and SVP-methanol chlorine dioxide generators benefit in production capability by the use of sodium chlorate solutions having a low chloride ion content. In addition, the chlorine dioxide aqueous solutions produced in SVP-methanol type generators contain less chlorine in the aqueous chlorine dioxide aqueous solution when low chloride content solutions of sodium chlorate are used as feed solutions. In order to obtain the increased production capabilities of the SVP-methanol type chlorine dioxide generators, the costly time, energy, and space consuming steps of crystallizing and redissolving sodium chlorate to make a low chloride content feed solution for the R8 and SVP-methanol type chlorine dioxide generators have been required.

More recently, it has been found possible to obtain low chloride ion content aqueous solutions of sodium chlorate by the use of cascading electrochemical cells, connected in series, having specially designed anodes. These cells which are often supplied for on-site chlorate solution production in the wood pulp mill by the assignee of the instant application are particularly adapted for providing an aqueous solution of sodium chlorate to R8 and SVP-methanol type chlorine dioxide generators which will allow these generators to operate at high production efficiency while producing aqueous chlorine dioxide solutions containing low chlorine content. Accordingly, it is to such low chlorine content aqueous solutions of sodium chlorate to which the process of this invention is particularly adapted.

Low levels of chromium ions are required in electrolytic cell liquors in cells for the production of alkali metal chlorates, particularly, sodium chlorate, in order to increase the current efficiency of the cells, for instance, from about 70% current efficiency to about 95% current efficiency. In addition, the presence of low levels of chromium ion in electrolytic chlorate cells inhibits the formation of explosive mixtures of hydrogen and oxygen. It has been estimated that for every ton of sodium chlorate solution prepared in electrolytic chlorate cells, about 2-10 kilograms of sodium dichromate are present as a contaminate where no effort is made to remove the sodium dichromate.

Although the sodium dichromate has no effect on chlorine dioxide production by reduction of sodium chlorate utilizing the Rapson R-2 process, in the more modern R8 and SVP-methanol chlorine dioxide processes, the presence of chromate ions reduces process efficiency by preventing the smooth operation of the chlorine dioxide generating process. That is, the presence of chromate ions inhibits the crystal growth of the sodium sesquisulfate by-product of the process and thus, makes more difficult its removal. In addition, the environmental impact of the discharge of sodium dichromate in the pulp mill effluent is a serious environmental concern in view of the fact that a 100 thousand tons per annum sodium chlorate plant producing 10 percent of its product as cell liquor would discharge the equivalent of some 20-100 tons per annum of sodium dichromate.

There are a number of methods in the prior art for the removal of alkali and alkaline earth metal chromates from cell liquors. Prior art methods include reduction of the chromate to mixed chromous and chromic salts with the precipitation of insoluble hydroxides in processes in which reduction is effected by water soluble sulfides, hydrazine, hydroxylamine, sulfites, ion exchange techniques, such as those processes disclosed in U.S. Pat. No. Re. 30,081, and Canadian Patent No. 1,035,874 and U.S. Pat. No. 3,980,751, precipitation of chromates, such as those processes disclosed in U.S. Pat. No. 4,086,150; Canadian Patent Nos. 1,124,676 and 1,133,641, and electrochemical means. Many of these processes present problems which make their use either uneconomic or otherwise undesirable. Some of these processes are discussed in copending U.S. application Ser. No. 07/923,378, filed Jul. 31, 1992, incorporated herein by reference.

Chlorine dioxide is an oxidation agent and an important bleaching agent in the pulp industry where it is the most common bleaching agent used in the final stages of pulp bleaching. Recently, there has been an increased use of chlorine dioxide instead of other bleaching agents especially hypochlorite and chlorine. It is known that the use of chlorine in bleaching pulp leads to the production of dioxins which are released to the environment in the disposed wastes. Hypochlorite solutions, when used in bleaching pulp, lead to the formation of chloroform which cannot be tolerated in the paper industry at any concentration. Accordingly, there is a decreased use of chlorine and hypochlorite as bleaching agents in the wood pulp industry. Chlorine dioxide is usually prepared by the reduction of an aqueous solution of sodium chlorate. Modern methods of preparation utilize methanol as a reducing agent in accordance with the following formula:

(The Rapson R-8 Process)

I

The gases chlorine and carbon dioxide are produced as by-products in the Rapson R-8 process. Passage of these gases through a sodium hydroxide scrubber produces an aqueous liquor stream of sodium chloride, sodium hypochlorite and sodium carbonate. It is essential from an economical as well as an environmental point of view that this liquor be utilized. A process for conversion of these waste gases comprising chlorine and carbon dioxide to (1) carbon dioxide free of chlorine and (2) an aqueous solution of sodium chlorate is disclosed in copending U.S. application Ser. No. 07/924,546, filed Jul. 31, 1992, incorporated herein by reference.

Alkali metal chlorate, and in particular sodium chlorate has been produced by the electrolysis of aqueous solutions of alkali metal chlorides, such as sodium chloride, in electrolytic cells equipped with or without membranes or diaphragms. Typically, electrolytic cells make chlorates within the cell by reacting chlorine produced at the anode with alkali metal hydroxide produced at the cathode. Representative electrolytic cells of this type are shown in U.S. Pat. No. 3,732,153 and in U.S. Pat. Nos. 3,819,503; 3,791,947; 3,819,504; 3,864,237, and 3,915,817. Various other arrangements of both electrochemical and combinations of electrochemical and chemical methods for manufacturing chlorates have also been proposed, such as the use of a two compartment permselective membrane equipped electrolytic cell operating in conjunction with a diaphragmless-type electrolytic chlorate cell. This method is disclosed in U.S. Pat. No. 3,897,320 to E. H. Cook. However, to obtain improved current efficiencies and significant reductions in electrical power requirements in the production of inorganic chlorate, U.S. Pat. No. 3,464,901 provides for the electrochemical preparation of chlorine and caustic soda in a diaphragm type chloralkali cell. The caustic soda containing unreacted alkali metal chloride and alkali metal chlorate is then removed from the cell and mixed and chemically reacted with chlorine from the anolyte of the cell. The chemical reaction is carried out at a pH of 6 to 8 to convert the alkali metal hypochlorite to chlorate. However, in order to maintain the conditions most favorable for converting hypochlorite to chlorate, additional caustic and/or acid over and above that supplied by the cell has to be added to the reaction mixture. In the case of Japanese Pat. No. 792,025 dilute chlorine is reacted with less than 20 percent caustic soda to produce a concentrated sodium hypochlorite solution with sufficient caustic remaining in it to produce a pH of 8 to 10. The solution is subsequently diluted from about 13 to 15 percent sodium hypochlorite to 6 to 8 percent sodium hypochlorite with a recycled stream of alkali metal chloride and chlorate. The diluted stream is then acidified with hydrochloric acid to a pH of about 6.0 and finally fed to an electrolysis cell.

In U.S. Pat. No. 4,175,038 to Sakowski, a process is disclosed for reducing the available chlorine content of aqueous waste streams, especially calcium hypochlorite waste streams. In the process of this reference, the available chlorine content is reduced by chlorinating the impure stream at a temperature in the range of about 80° to 100° C. at a pH in the range of about 5.5 to about 8.5. During this reaction, the available chlorine is reacted to form the corresponding chlorate.

In U.S. Pat. No. 4,159,929 to Grotheer, a process is disclosed for producing alkali metal chlorates by the reaction of an aqueous solution of an alkali metal chloride, alkali metal chlorate and an alkali metal hypochlorite with an alkali metal hydroxide. Chlorine is added to the reaction mixture in an amount sufficient to maintain the pH of the reaction mixture at about 5-7.5 in order to promote the conversion of alkali metal hypochlorite to alkali metal chlorate. Subsequently, the reaction product is led to an electrolysis cell for the production of an alkali metal chlorate. Instead of feeding brine to the electrolytic sodium chlorate cells, the feed solution is made by reacting a sodium hydroxide solution with chlorine at neutral pH to make a weak sodium chlorate solution which is then electrolyzed in electrochemical cells to a strong sodium chlorate solution. Gaseous chlorine is added to the caustic in an in-line mixer at 70°-80° C. in an amount such that the pH of the mixture is controlled at 5.0-7.5. The resulting hypochlorite solution is then held in an aging tank to allow the hypochlorite to convert to chlorate.

The chlorine and chemical feeds to the process of Grotheer are relatively pure and no provision is made to deal with situations where carbonates may be present, such as tail gases from a methanol type chlorine dioxide generator. The system does not show any way to purify or handle effluent gases which may emanate from the chlorine/caustic reaction, nor does it show any way to deal with foam which would accompany such gases. Also, the in-line mixer and aging tank are not vented and any gases emanating from the reaction, such as $CO_2$, could create unsafe pressures. Venting these vessels would release chlorine and hypochlorite to the atmosphere, but employing a scrubber would return such gases as $CO_2$ to the system as carbonate or bicarbonate which would build up to the saturation point and shut the process down.

Also, the process of Grotheer does not produce a chlorate solution low enough in hypochlorite concentration to be purified by conventional means, such as ion exchange. This means that dilute hypochlorite solutions, such as would be discharged from a chlorine tail gas scrubber, would not be suitably treated to be, for example, saturated with NaCl and purified for recycle to electrolytic sodium chlorate cells.

In summary, the process of Grotheer is not able to handle chlorine tail gases or hypochlorite solutions which contain $CO_2$ or carbonates, nor is the process able to produce a chlorate solution which can be recycled in a closed loop system unless the component chemicals are very pure.

In U.S. Pat. No. 4,216,195 to Jaszka, the production of chlorine dioxide having a low chlorine content is disclosed. A separation technique is utilized in which a gaseous product stream from a chlorine dioxide generator is scrubbed with an aqueous salt mixture containing an approximately stoichiometric quantity of sodium hydroxide. The scrubbing media is a controlled solution of sodium chlorate, sodium chloride and sodium hydroxide which is free of carbonate. The process is not applicable for processing of hypochlorite effluent streams. The sodium hydroxide reacts preferentially with the chlorine in the gas stream, yielding chlorine dioxide of high purity and converting the chlorine to sodium chlorate and sodium chloride which may then be recirculated to a chlorine dioxide generator.

Various processes are disclosed in the prior art for the destruction of hypochlorite, for instance, by reacting the hypochlorite with an acid to produce chlorine, U.S. Pat. No. 4,404,179; the reaction of chlorine with hydrazine in U.S. Pat. No. 3,823,225; or the reaction of an alkali metal hypochlorite with urea, U.S. Pat. No. 4,508,697.

In U.S. Pat. No. 4,620,969 to Wilkinson, a process is disclosed for the production of chlorine by the electrolysis of an aqueous solution of sodium chloride. In part of this process, a gaseous stream containing chlorine and carbon dioxide are passed into a first reaction vessel and thence into a second reaction vessel and aqueous sodium hydroxide solution is charged to the first reaction vessel and aqueous sodium hydroxide is separately charged to the second reaction vessel. An aqueous solution containing sodium hypochlorite is removed from the first reaction vessel and an aqueous solution containing an alkali metal carbonate is removed from the second reaction vessel.

In U.S. Pat. No. 4,129,484 to Larsson, a process is disclosed for the utilization of residual solutions obtained from a chlorine dioxide reactor in which sodium chlorate is reduced to chlorine dioxide in the presence of an acid. The residual solutions are converted to chlorate by leading the residual solutions to an electrolytic cell having at the anode region of the cell an acid enriched fraction of the residual solution.

SUMMARY OF THE INVENTION

In the integrated process of the invention for the production of an aqueous solution of alkali or alkaline earth metal chlorate and the production of chlorine dioxide by the reduction of said chlorate solution, chromium compounds, especially compounds containing chromium in the hexavalent state in said alkali or alkaline earth metal chlorate solution are substantially removed by reacting this solution with a reducing agent, generally, consisting of hydroxylamine, an addition compound, or salt thereof so as to obtain an alkali or alkaline earth metal chlorate solution having a concentration of chromium compounds of about 10 parts per million or less. The chromium compounds upon reaction with a reducing agent are precipitated and, after separation from said aqueous metal chlorate solution, can be recycled to an electrochemical cell for the production of an aqueous metal chlorate solution. Said aqueous metal chlorate solution containing about 10 parts per million or less of chromium ions is particularly suitable as a feed solution for a chlorine dioxide generator in which methanol and an acid are used as reactants to reduce the metal chlorate solution to chlorine dioxide. The chromium compound removal reaction is conducted at a neutral or acid pH, generally, at a pH of about 4.0 to about 6.5 and at an elevated temperature, generally, at a temperature of about 60° C. to about 100° C., preferably, at about 70° C. to about 95° C., and, most preferably, at about 85° C. to about 95° C.

In the integrated process of the invention, the large volumes of alkali or alkaline earth metal hypochlorite and other products produced as by-products of the production of chlorine dioxide in which an aqueous alkali or alkaline earth metal chlorate is reduced utilizing an acid and methanol can be converted to a dilute solution of an alkali or alkaline earth metal chlorate and utilized as a portion of the feed solution of an electrochemical cell for the production an alkali or alkaline earth metal chlorate. In the hypochlorite conversion steps of the process of the invention, the waste gases, comprising carbon dioxide or chlorine and carbon dioxide, subsequent to scrubbing with an aqueous alkali or alkaline earth metal hydroxide are reacted with an acid or chlorine gas. The substantially chlorine-free carbon dioxide produced in this reaction is vented to the atmosphere and the remaining components of the aqueous waste stream are converted to a dilute, aqueous solution of an alkali or alkaline earth metal chlorate which is suitable as a feed solution, when combined with an additional salt solution, for an electrochemical cell for the production of an alkali or alkaline earth metal chlorate.

BRIEF DESCRIPTION OF THE FIGURES

The objects and advantages of the present invention will be more clearly understood when considered in conjunction with the accompanying drawings, in which.

DETAILED DESCRIPTION OF THE INVENTION

Figure 1:
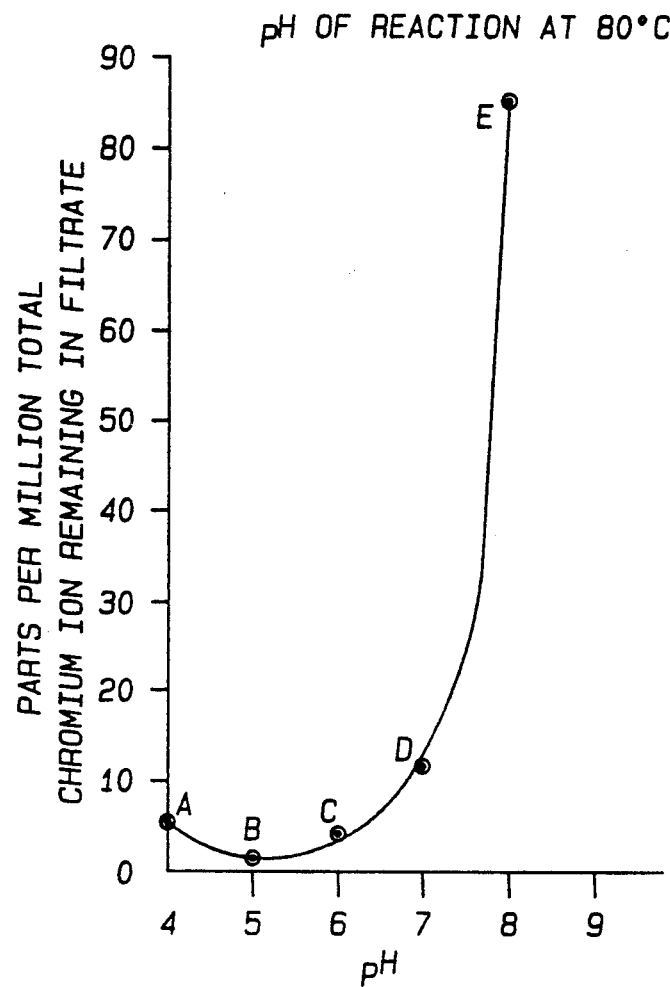
FIG. 1 is a graph showing the amount of hexavalent chromium ions remaining in the filtrate of an aqueous sodium chlorate solution subsequent to reaction at 80° C. with hydroxylamine sulfate at various pH conditions. In this reaction, a mol ratio is used of 2 mol hydroxylamine sulfate to 1 mol of compounds containing chromium in the hexavalent state, generally, present as sodium bichromate dihydrate ($Na_2Cr_2O_7 2H_2O$).

It is an object of the present invention to provide an integrated process for removing compounds containing chromium from aqueous alkali or alkaline earth metal chlorate solutions produced in an electrochemical cell in order to make these solutions particularly suitable for use in a chlorine dioxide generator in which an acid and methanol are used in the process of reducing an aqueous chlorate solution to chlorine dioxide. In addition, it is an object of the present invention to cycle the chromium compounds removed from said chlorate solution back to an electrochemical cell for the production of an alkali or alkaline earth metal chlorate solution. The integration of a process for the electrochemical production of an alkali or alkaline earth metal chlorate with a process for the production of chlorine dioxide is completed by use of a process for converting the waste gas mixture of carbon dioxide or chlorine and carbon dioxide, produced in said chlorine dioxide process, to a dilute solution of an alkali or alkaline earth metal chlorate for cycling to said electrochemical cell and chlorine-free carbon dioxide for release to the atmosphere.

The electrochemical generation of sodium chlorate is one of the simplest electrochemical processes and is the second largest application of electrosynthesis. Current world capacity approaches 3 million tons per annum. As indicated above, sodium chlorate is used as an intermediate by the paper industry to produce chlorine dioxide for bleaching of wood pulp. In this use, it is replacing chlorine because it is desirable to reduce the level of toxic chloro-organic compounds which are produced during chlorine bleaching and, ultimately, discharged with pulp mill effluents.

Modern chlorine dioxide generators which utilize an acid and methanol as reactants require aqueous alkali or alkaline earth metal chlorate solutions which are substantially free of chromium compounds, particularly chromium compounds containing chromium in the hexavalent state. Accordingly, it is desirable to integrate the chromium compound removal process steps of the invention into a process for the production of chlorine dioxide in which an acid and methanol are used as reactants. Such chlorine dioxide generators, generally, produce large volumes of alkali or alkaline earth metal hypochlorite and alkali or alkaline earth metal carbonates upon scrubbing with an alkali or alkaline earth metal hydroxide the waste gases comprising chlorine and carbon dioxide produced as by-products of the conversion of an alkali or alkaline earth metal chlorate to chlorine dioxide. The chlorine in said waste gas mixture may be removed from the waste gas mixture leaving a waste gas mixture comprising carbon dioxide for use in one embodiment of the process of the invention. In accordance with the integrated process of the invention, said alkali or alkaline earth metal hypochlorite is converted to a dilute, aqueous solution of an alkali or alkaline earth metal chlorate which can be utilized as a portion of the feed solution of an electrochemical cell for the production of an alkali or alkaline earth metal chlorate. As noted above, said metal carbonates are converted to chlorine-free carbon dioxide and vented to the atmosphere.

In the following description, the more commonly used alkali metal, sodium, is often named as an example of alkali metal when referring to the hydroxide and various salts produced. One skilled in this art will understand that other alkali or alkaline earth metal hydroxides and salts will be useful in the process of the invention.

In one embodiment of the process of the invention, the sodium hypochlorite produced by scrubbing a gas stream containing chlorine and carbon dioxide can be cycled after conversion to an aqueous solution of sodium chlorate to an electrochemical cell for the production of sodium chlorate and utilized in admixture, for instance, with a brine feed for such an electrochemical cell. For instance, sodium hypochlorite is converted to sodium chlorate by reacting sodium hypochlorite with chlorine gas and/or an acid at elevated temperature. The remaining constituents of the aqueous waste stream, after scrubbing with aqueous sodium hydroxide comprise sodium hydroxide, sodium carbonate, and sodium chloride. The sodium carbonate is converted to carbon dioxide and vented to the atmosphere and the remaining components of the waste aqueous stream are converted to an aqueous solution of sodium chlorate which can be cycled, if desired, to an electrochemical cell for the production of sodium chlorate. Brine is the usual feed for such a cell.

Instead of using gaseous chlorine as a reactant in the process of the invention, an acid can be used such as hydrochloric acid or sulfuric acid. However, the use of chlorine gas as a reactant in the process of the invention provides an aqueous sodium chlorate solution which is not further diluted by the water in the hydrochloric acid or sulfuric acid reactant and an increased yield of the sodium chlorate product is obtained.

DETAILED DESCRIPTION OF THE FIGURES

The increase in efficiency of the removal by precipitation of chromium compounds resulting from the suitable adjustment of the pH of the reaction mixture of an aqueous sodium chlorate solution and hydroxylamine sulfate as a reducing agent is demonstrated graphically in FIG. 1 in which the letters A-E indicate separate experimental reactions in which the pH of the reaction mixture was adjusted to pH 4, 5, 6, 7, and 8.

Figure 2:
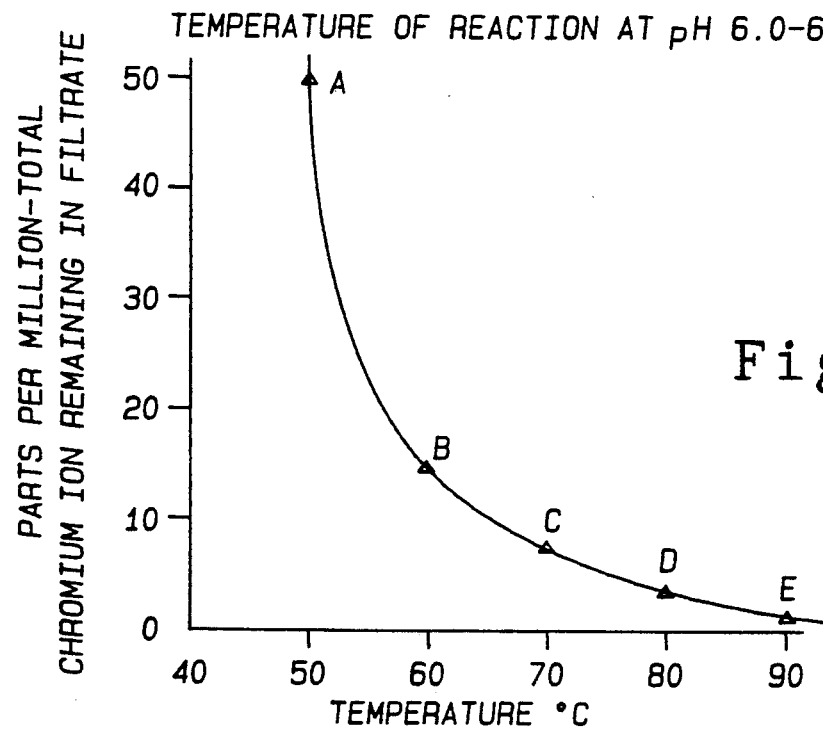
FIG. 2 is a graph showing the amount of hexavalent chromium ions remaining in the filtrate subsequent to reaction at pH 6.0–6.5 of hydroxylamine sulfate with an aqueous sodium chlorate solution containing compounds containing chromium in the hexavalent state wherein the reaction is conducted at various temperatures and the precipitate formed at each reaction temperature is removed by filtration.

As indicated in FIG. 2, the efficiency of the removal of chromium compounds from the reaction mixture described in FIG. 1 is markedly dependent upon the temperature of the reaction mixture when this reducing agent is utilized in the process of the invention. In order to achieve a filtrate, subsequent to removal of the precipitated chromium compounds, wherein the filtrate has less than about 10 parts per million of chromium ions content, it is necessary to perform the process of the invention at the appropriate pH and reaction temperatures. As shown in FIG. 2, at pH 6.0-6.5 a reaction temperature of 50° C. shown at A on the curve of FIG. 2 results in a filtrate having 50 ppm chromium ion remaining after reaction. At B, C, D, and E on the curve shown in FIG. 2, the chromium in remaining in the filtrate is, respectively, 15 ppm, 8 ppm, 4 ppm, and 2 ppm.

Figure 3:
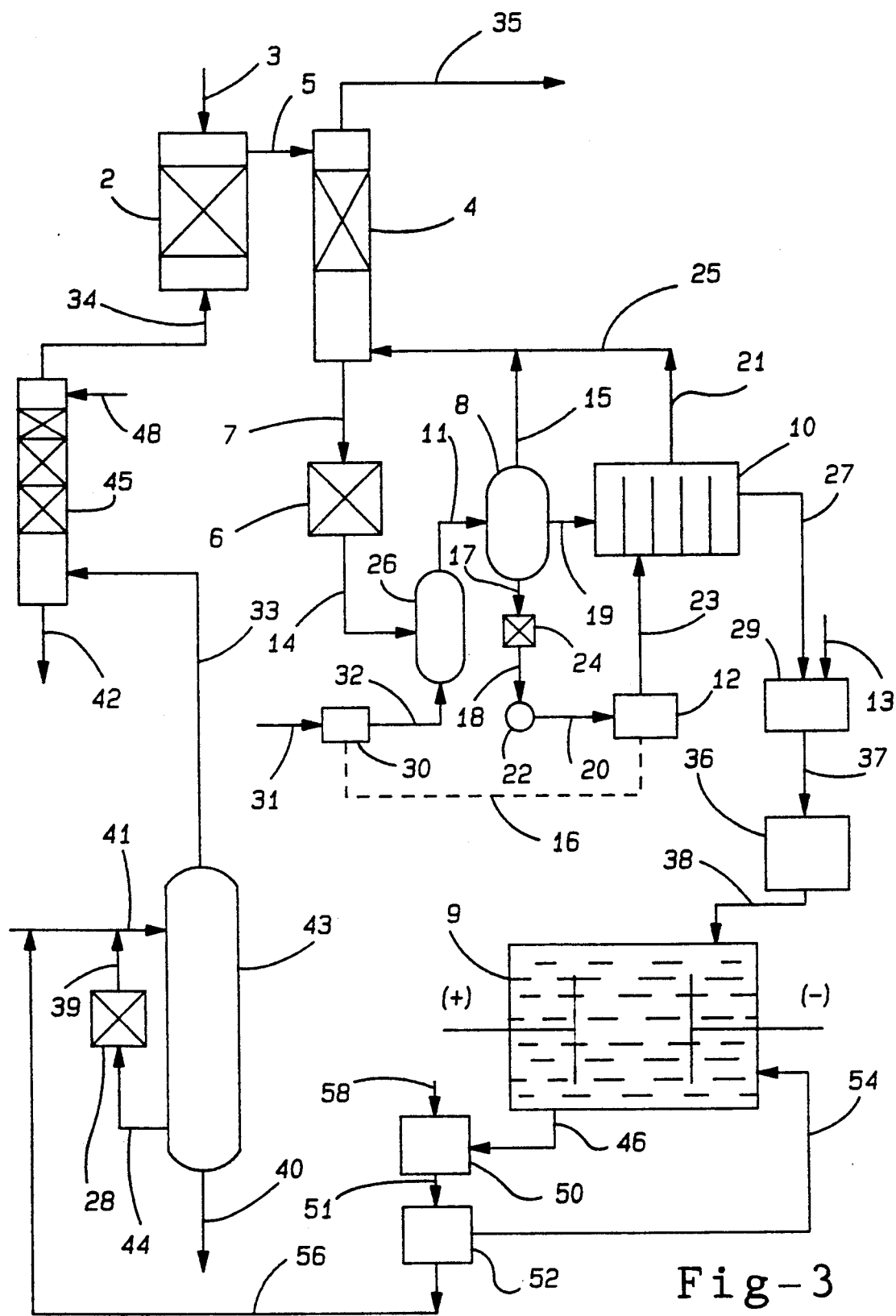
FIG. 3 is a schematic flow sheet illustrating one embodiment of the integrated process of the invention in which (1) the conversion of waste gases from a chlorine dioxide generator comprising chlorine and carbon dioxide to a dilute sodium chlorate solution and chlorine-free carbon dioxide is combined with (2) a process for removal of chromium compounds from an electrochemically produced alkali or alkaline earth metal chlorate, aqueous solution, (3) an electrochemical cell for the production of said metal chlorate, and (4) a chlorine dioxide generator in which a metal chlorate is reduced to chlorine dioxide by reaction with methanol and an acid.

Referring now to FIG. 3 which is a schematic flow sheet illustrating the process steps for the conversion of a mixture of waste gases comprising chlorine and carbon dioxide to a dilute, aqueous solution of sodium chlorate, said waste gases produced in the generation of chlorine dioxide are converted in scrubber 2 with aqueous sodium hydroxide to a mixture of sodium hypochlorite, sodium carbonate and sodium chloride as an aqueous, alkaline solution. This aqueous solution is, thereafter, led through line 5 to the top of packed bed column 4 in which the aqueous liquid passes downward by gravity while contacting rising vapors of chlorine, carbon dioxide and water which enter through line 25 at the bottom of packed bed column 4. The solution exiting the bottom of packed bed column 4 is led through line 7 to heat exchanger 6 and thence through line 14 to first reaction zone 26 where the heated liquid is initially reacted with chlorine gas and/or an acid entering through line 32, the amount of which is controlled by pH controller 12 by way of control circuit 16 acting upon chlorine gas controller 30. Chlorine gas enters gas controller 30 through line 31 and exits through line 32.

Measurement of the reaction solution pH occurs in second reaction zone 8 into which the solution from reaction zone 26 is ultimately led via line 11. Measurement of pH is effected by leading a portion of the reaction mixture in reaction zone 8 through lines 17 and 18 by way of heat exchanger 24, the rate of withdrawal of reaction mixture being controlled by pump 22. The reaction mixture is led to pH controller 12 by way of line 20 and, after sampling is returned through line 23 to third reaction zone 10. Gaseous reaction products exit second reaction zone 8 through line 15 and are led through line 25 to the bottom of packed bed column 4. Liquid reaction products exit second reaction zone 8 through line 19 and enter third reaction zone 10. Dilute, aqueous chlorate solution exits third reaction zone 10 by way of line 27, while gaseous products produced in third reaction zone 10 are led to the bottom of packed bed column 4 via lines 21 and 25. These gaseous products produced in second and third reaction zones 8 and 10, carbon dioxide and chlorine, together with water vapor rise in packed bed column 4 and initially react with the descending sodium hypochlorite, sodium carbonate and sodium chloride. Chlorine-free carbon dioxide is released to the atmosphere through line 35 at the top of packed bed column 4.

The dilute chlorate solution exiting through line 27 from third reaction zone 10 is led to salt saturator 29 and combined therein with a brine solution entering through line 13. A saturated salt solution exits salt saturator 29 through line 37 and enters chemical or ion exchange purification zone 36 and thence by line 38 enters an electrolytic cell 9 for the production of sodium chlorate. The aqueous sodium chlorate product solution is led from electrolytic cell 9 via line 46 to reaction zone 50 which is fed with an aqueous solution of reducing agent through line 58. The reaction product is led through line 51 to filter 52. After filtration, the filtrate is led through lines 56 and 41 to chlorine dioxide generator 43. The precipitated chromium compounds are, after filtration, returned to electrolytic cell 9 through line 54. Heat exchanger 28 is used to provide heat for accelerating the reaction in chlorine dioxide generator 43 using lines 44, 39, and 41 to circulate the contents of chlorine dioxide generator 43. A reducing agent and an acid, preferably, methanol and sulfuric acid, are also added through line 41 to chlorine dioxide generator 43. Salt cake is withdrawn from chlorine dioxide generator 43 through line 40 and the remaining products of the reaction, chlorine dioxide, carbon dioxide, chlorine and water vapor exit through line 33 to absorber 45 which is fed with chilled water through line 48. Aqueous chlorine dioxide solution is withdrawn through line 42 from absorber 45 and waste gases are led from absorber 45 through line 34 to tail gas scrubber 2.

The hypochlorite solution entering packed bed column 4 through line 5 may be any concentration and does not have to be pure. The hypochlorite solution may be alkaline and may contain chloride, chlorate, carbon dioxide, carbonate or bicarbonate in any combination up to the saturation point. For example, in a system where the compounds are in the sodium form, the maximum sodium ion concentration would be 5.4 gm-moles/liter with a preferred range of 1.0-4.0 gm-mole/liter. The pH of the hypochlorite solution is normally between 11 and 14, although other pH's are possible. There is no temperature limitation on the hypochlorite solution, although a temperature of 10°-30° C. is preferred. The source of the hypochlorite may be from chlorine scrubbers in chlorate plants, chlorine plants, chlorine dioxide generators, water treatment plants, etc. The aqueous hypochlorite feed solutions are introduced into packed bed column 4 via line 5. Optionally, chlorine gas optionally mixed with compounds such as air, hydrogen, carbon dioxide, etc, enter via line 34 and may be reacted with any suitable caustic solution fed via line 3 to any suitable tail gas scrubber column 2.

In reaction zone 26, chlorine entering via line 32 reacts with most of the bicarbonate or carbonate in the hypochlorite solution to form $CO_2$ whereupon the $CO_2$, which forms as small bubbles, causes the hypochlorite solution to foam. Simultaneously, hypochlorite immediately starts converting to chlorate. A gas/liquid mixture of carbon dioxide, chlorine, water vapor, foam, metal hypochlorite, metal chlorate and metal chloride travel co-currently from the bottom to the top of the reactor in a very turbulent fashion. The combination of all of the gases in the gas/liquid mixture is called the effluent gases. The reactions are as follows:

$$NaHCO_3 + Cl_2 \rightarrow HClO + NaCl + CO_2 \qquad \text{II}$$

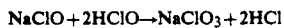

$$NaClO + 2HClO \rightarrow NaClO_3 + 2HCl \qquad \text{III}$$

The effluent gases displace some of the liquid in the chlorination reactor 26 in an amount proportional to the rate of gas evolution. These gases move around the reactor at a high velocity carrying the foam and some of the hypochlorite solution such that a violent washing action is set up. The violent washing action provides intimate contact between the gases and liquid and this causes the foam to break up.

Hypochlorite solution, along with effluent gases from reaction zone 26, are introduced beneath the liquid level of reaction zone 8 via line 11. Most of the carbonate and bicarbonate has now been liberated as $CO_2$. The effluent gases are now large bubbles. Any remaining foam is broken up when the effluent gases are introduced into the liquid in reaction zone 8 so that there is no foam in the affluent gases leaving reaction zone 8. The effluent gases from reaction zone 8 enter packed bed column 4 via lines 15 and 25. Up to 20% $Cl_2$ by volume as chlorine gas and mist containing hypochlorite can be present in the effluent gases.

Hypochlorite solution from reaction zone 8 overflows to reaction zone 10 where the remaining hypochlorite is converted to chlorate and the remaining carbonate together with other effluent gases are liberated to packed bed column 4 through lines 21 and 25. The final weak chlorate solution exiting from reaction zone 10 via line 27 has minimal hypochlorite and carbonate, preferably <1 gpl as NaClO and <1 gpl as $Na_2CO_3$.

Chlorine is added in an amount to achieve optimum performance of the system. Optimum performance is achieved when chlorate conversion efficiencies are maximized, hypochlorite and carbonate levels in the final weak chlorate solution are minimized, and total chlorine in the effluent gases discharging from the system is minimized. This is usually realized when the pH of the final weak chlorate solution from reaction zone 10, generally, is 5.0-8.5, preferably, 6.0-7.5 and, most preferably, 6.4-6.9.

The temperature in reaction zone 26, reaction zone 8 and reaction zone 10 are determined by the temperature of the hypochlorite solution leaving heat exchanger 6.

The concentration of hypochlorite in reaction zone 8 is, generally, in the range of 1-10 gpl as NaClO, and, preferably, 3-5 gpl. The concentration of bicarbonate is, preferably, <10 gpl and, preferably, <5 gpl.

A single pH control point controls the overall performance of the system. Good pH control is necessary to achieve optimum performance, which usually is achieved when the pH of the final weak chlorate solution exiting from reaction zone 10 is in the most preferred 6.4-6.9 range. The pH is controlled, generally, by adding chlorine gas or acid to chlorination reaction zone 26 via line 37, and measuring the pH in reaction zone 8. Chlorine is preferred. The addition of chlorine gas to chlorate conversion reaction zone 8 lowers the pH. The desired pH control range in reaction zone 8 to achieve optimum performance is dependent on the composition of the hypochlorite feed solution, the temperature of the hypochlorite feed solution and the specific engineering design of the system. For example, in systems where some bicarbonate is still present in the hypochlorite solution entering reaction zone 10 via line 19, the bicarbonate will cause the pH in reaction zone 10 to go up and accordingly, the pH control range in chlorate conversion reaction zone 8 has to be set proportionally lower. For example, if the bicarbonate concentration in line 19 is 5 gpl, the pH control range in chlorate conversion reaction zone 8 would be, generally, 4 to 6 and, preferably, 4.8 to 5.2. If no bicarbonate is present the pH control range would be 5 to 7 and preferably 6.4 to 6.9.

The method of adding the pH adjusting chlorine gas or acid to one vessel and then measuring the pH in a different vessel, thereby intentionally introducing measurement lag time, is not a conventional method of pH control. Conventionally, the pH of a chemical system is measured as close as possible to the point of chemical mixing, otherwise conventional systems become insensitive to changes in chemical feed rate and run out of control. Applying conventional methods to the present system would put the pH measurement and control point in reaction zone 26. However, pH control in the chlorination reaction zone 26 was found to be unachievable because of the violent evolution of gas and foam, and also because even small changes in the chlorine feed rate, or of the pH of the incoming hypochlorite solution, cause large and rapid pH fluctuations in this reactor. In reaction zone 8, foam and gases are dissipated and short term pH fluctuations are damped out by the larger volume of solution. Measurement lag time unexpectedly turned out not to be a problem because of the nature of the system, as described below.

If chlorine is added in excess relative to the amount of incoming bicarbonate in the hypochlorite solution, it enters reaction zone 8 via line 11 with the gas liquid mixture leaving chlorination reaction zone 26 where it makes hypochlorous acid and hydrochloric acid and immediately lowers the pH. If chlorine is added in further excess, it enters packed bed column 4 from reaction zone 8 where it lowers the pH of the hypochlorite solution feeding reaction zone 26 which further lowers the pH in reaction zone 8. If too little chlorine is added relative to the amount of incoming bicarbonate in the hypochlorite solution, excess unreacted bicarbonate is carried into reaction zone 8 where it neutralizes the acidity and immediately raises the pH. The overall effect of adding chlorine or acid to reaction zone 26 and measuring the pH in the chlorate conversion reaction zone 8 is that there is unexpectedly no apparent measurement lag time, and pH control over the whole system is easily achieved.

If there is a loss of pH control such that there is a continued excess of chlorine coming into the system, a low pH condition will develop at the bottom and work its way to the top of packed bed column 4, until chlorine starts to discharge from the system with the vent gases. If there is a loss of pH control, and there is a continued deficiency of chlorine coming into the system, the pH of reaction zone 8 and reaction zone 10 will increase such that the weak chlorate solution discharging from reaction zone 10 will be alkaline and will contain substantial amounts of carbonate and unreacted hypochlorite.

Because of the high temperatures and hypochlorite normally present in reaction zone 8, pH measurement is done in a cooled, continuous external stream. Hot hypochlorite solution is pumped from the chlorate conversion reaction zone 8 with pump 22 via lines 17 and 18 through heat exchanger 24 to pH probe and transmitter 12 and then back to reaction zone 10 via line 23. The heat exchanger is used to cool the hypochlorite solution to a temperature not less than the saturation point of the solution, generally, between 5° and 40° C. The pH probe and transmitter 12 control the rate of chlorine or acid addition through control circuit 16 so that the desired pH in reaction zone 8 is achieved.

The hypochlorite solution which enters reaction zone 10 via line 19 is discharged via line 27 as a weak chlorate solution containing chloride compounds and other compounds. The makeup of the original hypochlorite solution feeding packed bed column 4 via line 5 determines what other compounds are present. Under optimum conditions the weak chlorate solution having up to 1 gpl NaClO should have essentially no carbonate or bicarbonate.

In the production of sodium chlorate, as noted above, chromium compounds containing chromium in the hexavalent state are added to the electrolyte in order to reduce the inefficiency at the cathode which would account for a significant decrease in current efficiency. Cathodic inefficiency reactions would account for a very significant decrease in current efficiency were it not for the use of hexavalent chromium ions in the electrolyte. Typically, chromium salts are included in the electrolyte in the amount of about 35 to about 2500 parts per million or about 0.1 to about 7 grams per liter (as sodium dichromate) in order to inhibit these cathodic inefficiency reactions. Accordingly, the product of an electrolytic cell for chlorate production contains alkali and/or alkaline earth metal chlorate, hypochlorite, and bichromate compounds. It is believed that the presence of sodium bichromate results in a modification of the cathode surface so that reduction of hypochlorite and chlorate is prevented.

The hexavalent chromium ion present in the aqueous solution of sodium chlorate and sodium chloride, is usually added to the electrolyte in the form of sodium bichromate in an amount sufficient to provide a hexavalent chromium ion concentration in the range of about 0.1 grams per liter to about 20.0 grams per liter (about 35 parts per million to about 700 parts per million) of total chromium ion as bichromate per liter of solution, preferably about 0.2 g/l to about 10.0 g/l (about 70 to about 3500 ppm), typically about 1 to about 5 g/l (350–1750 ppm). This concentration is decreased by the chromium compound removal process step of the integrated process of the invention, generally, to about 0.03 g/l or less (about 10 ppm), preferably, about 0.015 g/l or less (about 5 ppm), and, most preferably, about 0.01 g/l or less (about 3 ppm).

Although the hexavalent chromium ions are usually added to the aqueous sodium chloride electrolyte solution in the form of sodium bichromate ($Na_2Cr_2O_7 \cdot 2H_2O$), other forms of water-soluble hexavalent chromium ions can be employed, for example, sodium chromate ($Na_2CrO_4$), chromic acid ($H_2CrO_4$), potassium dichromate ($K_2Cr_2O_7$). Mixtures of two or more of such materials can be employed.

The integrated process of the invention has particular application to the treatment of aqueous solutions of sodium chlorate and sodium chloride produced by the electrolysis of an aqueous sodium chloride solution which are intended as feed solutions for a chlorine dioxide generator in which methanol is used as a reducing agent. The concentration of sodium chlorate and of sodium chloride in such aqueous solutions may vary widely, depending on the extent of electrolysis of the initial sodium chloride solution. In addition, the cell liquor usually contains hypochlorite compounds. Generally, the concentration of sodium chlorate in the cell product may vary from about 100 to about 750 g/l, preferably about 250 to about 675 g/l and the concentration of sodium chloride present may vary from about 20 to about 300 g/l, preferably about 50 to about 300 g/l.

Once the hexavalent chromium ions in the chlorate solution are reacted with the reducing agent of the invention, particles of chromium compounds containing chromium in the trivalent state, i.e., chromium oxide can be separated from the liquid by any suitable solid-liquid separation method such as by settling, filtering, centrifuging and the like. Filtration is the preferred separation method. In the process of the invention, filtration occurs at a substantially faster rate as compared with prior art processes for removal of precipitate containing chromium compounds in the trivalent state. One skilled in the art will recognize that any other suitable separation technique can be employed. The precipitated particles of chromium compound containing chromium in the trivalent state after separation from the liquid, may be washed if desired or fed directly to electrolytic sodium chlorate cells or first oxidized to compounds containing chromium in the hexavalent state and then fed to electrolytic sodium chlorate cells, or otherwise disposed of. The filtrate produced by the process of the invention is an aqueous solution of sodium chlorate which is substantially free of chromium ions and contains less than ten parts per million of total chromium ions. As such, the filtrate is particularly useful as a feed for a chlorine dioxide generator, particularly, a chlorine dioxide generator in which methanol is used as the reducing agent, as described above.

The reaction of a reducing agent, for instance, hydroxylamine sulfate with hexavalent chromium ions ion (as sodium bichromate dihydrate) can be illustrated by the following equation:

$$2(NH_2OH)_2H_2SO_4 + Na_2Cr_2O_7 \cdot 2H_2O + 2NaOH \rightarrow Cr_2O_3 + 2Na_2SO_4 + 11H_2O + N_2 + N_2O \qquad IV.$$

Accordingly, two moles of hydroxylamine sulfate are required for reaction with 1 mole of chromium ion present as sodium bichromate dihydrate. In laboratory tests, use of this stoichiometric amount of hydroxylamine sulfate provided essentially 100% removal of chromium ion from aqueous solutions containing 0.7 grams per liter to 4.0 grams per liter of sodium bichromate dihydrate. At least a stoichiometric amount of reducing agent is required in the process of the invention. Preferably, an amount of about 10% in excess of the stoichiometric amount is used. Other useful reducing agents include hydroxylamine, hydroxylamine hydrochloride, and hydroxylamine formate.

The temperature for conducting the chromium compound removal step of the process of the invention is important in achieving an efficient removal of chromium compounds. Generally, the process is carried out at an elevated temperature, generally, of about 50° C. to about 100° C., preferably, at about 70° to about 95° C., and, most preferably, at about 85° C. to about 95° C. As indicated in FIG. 2, the removal of chromium compounds is markedly dependent upon the temperature of the reaction. In order to achieve a filtrate, subsequent to removal of the precipitated chromium compounds, wherein the filtrate has less than about 10 parts per million of hexavalent chromium ions, it is necessary to perform the process of the invention at the above temperatures.

Similarly, in the chromium compound removal step of the process of the invention for optimum results and the reduction of hexavalent chromium ions in the filtrate to less than about 10 parts per million subsequent to filtration of the precipitated portion of the reaction solution, it is necessary to utilize a neutral or an acid pH, generally, a pH of about 4.0 to about 6.5, preferably, about 4.5 to about 6.0, and, most preferably, about 5.0 to about 5.5. Where an acid pH higher than 6.5 or other non-optimal pH is used, improved separation of compounds containing chromium can be obtained by the use of a reaction temperature at the high end of the ranges stated above. Since hydroxylamine sulfate is highly acidic in aqueous solution and because the above reaction proceeds most rapidly at weakly acidic conditions, a pH of about 5.0 to about 5.5, a base is, most preferably, added to aqueous solutions having a pH lower than the above optimum pH range.

The reaction time at elevated temperature of the chromium compound removal step of the process of the invention depends both upon the temperature at which the reaction is conducted and the pH of the reaction liquid. For the optimum speed of reaction, the pH should be adjusted to the most preferred range of about 5.0 to 5.5. As the temperature is increased from about 50° C. at which temperature the reaction takes over 30 minutes for completion, the reaction has been found to be complete in 30 minutes at a temperature of about 70° C. and the reaction has been found to be complete in only 10 minutes at a temperature of about 90° C. to about 95° C. With a temperature of about 50° C., the reaction would be complete in about 2 to about 3 hours.

The following examples illustrate the various aspects of the invention but are not intended to limit its scope. Where not otherwise specified throughout this specification and claims, temperatures are given in degrees centigrade and parts, percentages, and proportions are by weight/volume. References are to process components shown in FIG. 3 unless otherwise noted.

EXAMPLE 1

In this Example, the process step for removal of chromium compounds from an alkali or alkaline earth metal chlorate aqueous solution is described. This illustrates the chromium compound removal process aspect of the integrated process of the invention. A solution produced from an electrolytic sodium chlorate cell containing 630 grams per liter of sodium chlorate, 70 grams per liter of sodium chloride, and 1.5 grams per liter of sodium dichromate was placed in a 1 liter beaker in the amount of 500 milliliters and heated to 80°-85° C. while stirring with a magnetic stirrer. Hydroxylamine sulfate in the amount of 0.85 grams was dissolved in 2-3 milliliters of water and added to the sodium chlorate solution. The pH was controlled at pH 4.0 by the addition of 3 normal sodium hydroxide solution. The reaction mixture was stirred for 30 minutes at pH 4 and then filtered through 1 micron filter paper using a Buchner funnel. The filtrate obtained was clear and had no color. The total chromium ions remaining in the clear solution was 6.3 parts per million. The precipitate of chromium compounds in the trivalent or divalent state which remain on the filter paper can be dissolved with sodium hypochlorite or added back to the electrochemical cell as a slurry where it will be reoxidized to soluble hexavalent chromium ions by the hypochlorite ions present therein.

EXAMPLES 2-4 (INVENTIVE), AND 5 (CONTROL)

Example 1 was repeated except that the reaction was conducted at about 80° C. and successively at a pH of 5,6,7, and 8. The results obtained indicate optimum removal of chromium compounds at a pH of about 5.5.

The results of Examples 1-5 form the basis of the graph shown in FIG. 1 in which points A-E on the curve, respectively, represent the pH conditions under which the reactions described in Examples 1-5 were performed.

EXAMPLE 6 AND 7 (CONTROLS)

The process of Example 1 was repeated except that during the 30 minute reaction the pH was controlled at 6.0-6.5 and the reaction temperature was 50° C. and 60° C. The filtrate of Example 6 contained total chromium ions in the amount of about 50 parts per million and the filtrate of Example 7 contained about 15 parts per million chromium ions.

EXAMPLE 8

The process of Example 6 was repeated except that the temperature of the 30 minute reaction was 70° C. Example 8 forms partial basis for the graph shown as FIG. 2 in which a temperature of reaction of 70° C. or higher is shown to be critical at this pH to obtaining satisfactory removal of total chromium compounds so that less than about 10 parts per million chromium ion remains in the filtrate subsequent to reaction. The filtrate of Example 8 contained about 8 parts per million chromium ions.

EXAMPLES 9 AND 10

Example 6 was repeated except that during the 30 minute reaction the reaction temperature was successively controlled at 80° C. or 90° C. The filtrate of Example 9 contained about 3 parts per million chromium ions and the filtrate of Example 10 contained about 1 part per million chromium ions.

EXAMPLE 11

An additional unexpected advantage of the chromium compound removal aspect of the integrated process of the invention is the fact that the solid particles precipitated out of the chlorate solution during the process of the invention are more easily filtered than are reaction products of prior art removal processes. In order to demonstrate the marked difference in filtration rate between the solids produced in the chromium compound removal steps of the process of the invention in which the pH was maintained at pH 5.5 in comparison with the same reaction in which the pH was maintained at pH 8, Example 1 was repeated except that the reaction time was 45 minutes. The pH was maintained at 5.5 and the reaction temperature was maintained at 70° C. The chromium ions in the filtrate subsequent to reaction were found to be 1.0 part per million and the filtration time was found to be 8 minutes and 20 seconds. This compares favorably with the filtration rate of 13 minutes and 40 seconds obtained in the following control Example.

EXAMPLE 12 (CONTROL)

Example 1 was repeated except that the reaction time was 45 minutes and the reaction was conducted at a pH of 8 and a reaction temperature of 70° C. The filtration time was found to be 13 minutes and 40 seconds.

EXAMPLE 13

Example 11 was repeated except that instead of hydroxylamine sulfate as the reducing agent, hydroxylamine hydrochloride was used in the same amount. The reaction produced a filtrate having a chromium ion concentration of 0.6 part per million. The filtration time was 8 minutes and 5 seconds.

EXAMPLE 14 (CONTROL)

Example 13 was repeated except that a pH of 8.0 was maintained during the reaction. The chromium ion content of the filtrate was found to be 17.7 parts per million and the filtration time was found to be 12 minutes and 10 seconds.

EXAMPLE 15

In this Example, the process steps of the integrated process of the invention is described which relates to the conversion of the large volumes of hypochlorite and other products produced as by-products of the production of chlorine dioxide by reducing an aqueous chlorate solution by reaction with an acid and methanol. These process steps illustrate the conversion of chlorine dioxide production waste products to chlorine-free carbon dioxide and an aqueous chlorate solution as one aspect of the integrated process of the invention. This Example is described with reference to FIG. 3.

Packed bed column 4 was made of clear plastic pipe sold under the Trade name LEXAN. Two different kinds of packing were used in packed bed column 4. A packing density of 25–40% was obtained. A demister section which was used at the top of packed bed column 4 is not shown in FIG. 3. This was packed with glass wool.

A synthetic hypochlorite solution containing 1.7 gpl sodium hydroxide, 10.6 gpl sodium chlorate, 34.3 gpl sodium chloride, 40.6 gpl sodium carbonate, and 39.1 gpl sodium hypochlorite was fed through line 5 to the top of packed bed column 4 at a flow rate of 96.4 ml/min. The synthetic hypochlorite solution used was made from an aqueous sodium hypochlorite sold under the trade name CHLOROX, reagent grade $Na_2CO_3$ and NaOH, and tap water. The solution moved through the column by gravity. The pH of the hypochlorite solution was 12.5 entering packed bed column 4 via line 5, and ranged from 7.4 to 7.7 exiting packed bed column 4 via line 7.

The hypochlorite solution flowed via line 7 through heat exchanger 6, and then into reaction zone 26 via line 14, by gravity. The hypochlorite solution was heated in heat exchanger 6 so that the temperature in reaction zone 26 was 94° C. Chlorine was injected at the bottom of clear plastic reaction zone 26 via line 32.

An immediate reaction between the chlorine and hypochlorite solution took place which caused the evolution of gas and foam. This was easily observed in the clear plastic pipe reaction zone 26. The hypochlorite solution/foam/gas mixture travelled co-currently through reaction zone 26 and the mixture appeared visually to be homogeneous. By measurement, the liquid component of the mixture occupied ⅔ of the volume of reaction zone 26, and the gas component ⅓ of the volume.

The liquid/foam/gas mixture exited from the top of chlorination reaction zone 26 via line 11 to reaction zone 8. The liquid/foam/gas mixture entered the chlorate conversion reaction zone 8 through line 11. Effluent gases exited from the top of reaction zone 8 via line 15 and were led via line 25 to the bottom of packed bed column 4. It was observed that no foam or liquid was carried with the effluent gases into column 4.

The hypochlorite solution was withdrawn from reaction zone 8 via line 19 and was led to reaction zone 10 by gravity. Reaction zone 10 consisted of a train of titanium pipes connected so that the hypochlorite solution flowed from the first pipe to the last pipe in the train, and then out as a weak sodium chlorate solution into a catch tank via line 27 by gravity. The train was heated to 97°–98° C. by a water bath. Total retention time in the train was 51 minutes.

The feed rate of chlorine gas to the system was controlled by manually regulating a needle valve made of a plastic sold under the trade name TEFLON so that the pH in reaction zone 8 was maintained at an average of 6.4. The pH control range was 5.0 to 7.2. The pH was measured with a glass combination electrode at pH probe and transmitter 12 in external pH sampling loop encompassing lines 17, 18, 20, and 23, heat exchanger 24, pump 22, and pH probe and transmitter 12.

The test was run continuously for 8.6 hrs. over which time 50 liters of the synthetic hypochlorite feed solution was processed to a weak sodium chlorate solution. The conversion efficiency to sodium chlorate was 98% based on the available hypochlorite and alkalinity of the original feed solution. The final weak sodium chlorate solution exiting the reaction zone 10 via line 27 had an average pH of 6.1, and, by analysis, consisted of 0.82 gpl NaClO, 0 gpl $Na_2CO_3$, 40.6 gpl $NaClO_3$, and 89.4 gpl NaCl. The total chlorine and hypochlorite level in the effluent gases discharging from packed bed column 4 averaged 0.91 ppm (mg/liter), expressed as $Cl_2$. The range was 0.83–1.08 ppm. These levels were not detectable by smell, indicating that most of the chlorine was probably present as hypochlorite mist. Lower chlorine levels would be achieved by use of better mist eliminating equipment. Summarizing Example 15:

TABLE I

|  |  | Hypochlorite Feed Solution | Reaction Zone 8 | Weak Chlorate Recycle |
| --- | --- | --- | --- | --- |
| NaClO | (gpl) | 39.1 |  | 0.8 |
| $NaClO_3$ | (gpl) | 10.4 |  | 40.7 |

TABLE I-continued

|  |  | Hypochlorite Feed Solution | Reaction Zone 8 | Weak Chlorate Recycle |
|---|---|---|---|---|
| NaCl | (gpl) | 34.2 |  | 89.4 |
| $Na_2CO_3$ | (gpl) | 40.6 |  | 0.0 |
| NaOH | (gpl) | 1.7 |  | 0.0 |
| pH |  | 12.5 | 5.0–7.2 | 6.1 |
| Temp. | (°C.) | Ambient | 94 | 97–98 |
| Chlorate Conversion Eff. | (%) | 98.0 |  |  |
| $Cl_2$ in Discharging Gases | (ppm) | 0.91 |  |  |
| Duration of test | (Hrs) | 8.6 |  |  |

EXAMPLE 16

The process of Example 15 was repeated but with a variation of the constituents in the alkaline hypochlorite solution added to packed bed column 4 as follows:

TABLE II

|  |  | Hypochlorite Feed Solution | Reaction Zone 8 | Weak Chlorate Recycle |
|---|---|---|---|---|
| NaClO | (gpl) | 39.3 | 3.5 | 1.2 |
| $NaClO_3$ | (gpl) | 1.3 |  | 37.1 |
| NaCl | (gpl) | 37.4 |  | 109.4 |
| $Na_2CO_3$ | (gpl) | 50.9 |  | 0.0 |
| NaOH | (gpl) | 9.8 |  | 0.0 |
| pH |  | 12.9 | 4.9–6.5 | 5.4 |
| Temp. | (°C.) | Ambient | 90 | 97–98 |
| Chlorate Conversion Eff. | (%) | 92.0 |  |  |
| $Cl_2$ in Discharging Gases | (ppm) | 1.60 |  |  |
| Duration of test | (Hrs) | 8.7 |  |  |

EXAMPLE 17

The process of Example 15 was repeated but with a variation of the constituents in the alkaline hypochlorite solution added to packed bed column 4 and process conditions as follows:

TABLE III

|  |  | Hypochlorite Feed Solution | Reaction Zone 8 | Weak Chlorate Recycle |
|---|---|---|---|---|
| NaClO | (gpl) | 39.7 |  | 0.9 |
| $NaClO_3$ | (gpl) | 1.3 |  | 36.0 |
| NaCl | (gpl) | 36.2 |  | 105.1 |
| $Na_2CO_3$ | (gpl) | 41.9 |  | 0.0 |
| NaOH | (gpl) | 9.8 |  | 0.0 |
| pH |  | 12.7 | 4.6–8.0 | 6.2 |
| Temp. | (°C.) | Ambient | 88 | 96–97 |
| Chlorate Conversion Eff. | (%) | 95.7 |  |  |
| $Cl_2$ in Discharging Gases | (ppm) | 1.49 |  |  |
| Duration of test | (Hrs) | 8.7 |  |  |

In this example at start up, all vessels were filled with the alkaline hypochlorite feed solution and the system was run under non-equilibrium 'upset' conditions until equilibrium was established in the packed bed column 4. Under 'upset' conditions pH fluctuations are fairly broad. After equilibrium conditions were established, the pH was controlled in the desired range of 6 to 7 yielding optimum performance for the system.

EXAMPLE 18

The process of Example 15 was again repeated but with the exception that 3M hydrochloric acid was used to acidify the system rather than chlorine gas:

TABLE IV

|  |  | Hypochlorite Feed Solution | Reaction Zone 8 | Weak Chlorate Recycle |
|---|---|---|---|---|
| NaClO | (gpl) | 36.4 |  | 1.23 |
| $NaClO_3$ | (gpl) | 2.7 |  | 13.6 |
| NaCl | (gpl) | 38.1 |  | 82.1 |
| $Na_2CO_3$ | (gpl) | 41.0 |  | 0.0 |
| NaOH | (gpl) | 9.8 |  | 0.0 |
| pH |  | 13.0 | 1.5–5.5 | 5.0 |
| Temp. | (°C.) | Ambient | 82 | 85–90 |
| Chlorate Conversion Eff. | (%) | 96.8 |  |  |
| $Cl_2$ in Discharging Gases | (ppm) | 0.98 |  |  |
| Duration of test | (Hrs) | 5.8 |  |  |

Note that the final product is more dilute because of the water fed in with the HCl.

EXAMPLE 19

The process of Example 15 was again repeated but with the exception that 1.5M sulfuric acid was used to acidify the system rather than chlorine gas as follows:

TABLE V

|  |  | Hypochlorite Feed Solution | Reaction Zone 8 | Weak Chlorate Recycle |
|---|---|---|---|---|
| NaClO | (gpl) | 35.1 |  | 0.9 |
| $NaClO_3$ | (gpl) | 3.5 |  | 13.0 |
| NaCl | (gpl) | 39.7 |  | 40.3 |
| $Na_2CO_3$ | (gpl) | 42.1 |  | 0.3 |
| NaOH | (gpl) | 10.0 |  | 0.0 |
| pH |  | 13.2 | 4.4–6.5 | 6.0 |
| Temp. | (°C.) | Ambient | 92 | 90–95 |
| Chlorate Conversion Eff. | (%) | 91.8 |  |  |
| $Cl_2$ in Discharging Gases | (ppm) | 1.17 |  |  |
| Duration of test | (Hrs) | 6.3 |  |  |

Note that the final product is more dilute because of the water fed in with the sulfuric acid.

EXAMPLE 20

In a separate experiment, the effluent gases discharging from packed bed column 4 via line 35 were bubbled from an open ended ¼" I.D. tube through a 3" deep volume of 50 gpl sodium sulfite solution ($Na_2SO_4$) to remove the last trace amounts of chlorine and hypochlorite. The chlorine concentration in the effluent gases was analyzed at 1.0 ppm $Cl_2$ before bubbling through the sodium sulfite solution, and 0.0 ppm afterwards.

EXAMPLE 21

In a separate experiment, the effluent gases discharging from the packed bed column 4 via line 35 were bubbled from an open ended ¼" I.D. tube through a 3" deep volume of 50 gpl urea ($CH_4N_2O$) solution to remove the last trace amounts of chlorine and hypochlorite. The chlorine concentration in the effluent gases was analyzed at 1.3 ppm $Cl_2$ before bubbling through sodium sulfite solution, and 0.6 ppm afterwards.

EXAMPLE 22

The processes of Example 1 and Example 15 are combined with an electrolytic cell 9 for the production of sodium chlorate, a chlorine dioxide generator 43, and attendant accessory equipment as follows: salt saturator 29, ion exchange purification zone 36, absorber 45, and scrubber 2 to provide the integrated process of the invention shown in FIG. 3.

While this invention has been described with reference to certain specific embodiments, it will be recognized by those skilled in the art that many variations are possible without departing from the scope and spirit of the invention and it will be understood that it is intended to cover all changes and modifications of the invention disclosed herein for the purposes of illustration which do not constitute departures from the spirit and scope of the invention.

The invention in which an exclusive property or privilege is claimed is defined as follows:

1. A process for producing chlorine dioxide comprising the steps of:
   (A) charging an electrochemical cell having an anode and a cathode with an input solution containing chromate values and an alkali metal chloride or an alkaline earth metal chloride dissolved in water;
   (B) electrolyzing the input solution in the cell to produce an output solution containing the chromate values and an alkali metal chlorate or an alkaline earth metal chlorate;
   (C) removing the chromate values from the output solution to obtain a treated solution that is substantially free of chromate values containing about 10 parts per million or less of total chromium ions by reacting the output solution at an elevated temperature and a neutral or an acid pH with a reducing agent selected from the group consisting of hydroxylamine, an addition compound thereof, and a salt thereof;
   (D) recycling the chromate values removed by inclusion in the input solution of step (A);
   (E) passing the treated solution of step (C) to a chlorine dioxide generator and producing chlorine dioxide and by-products from the treated solution;
   (F) converting the by-products to a substantially chlorine-free carbon dioxide and a reusable solution of an alkali metal chlorate or an alkaline earth metal chlorate, and
   (G) venting the carbon dioxide and recycling the reusable solution by inclusion in the input solution of step (A).

2. The process of claim 1 wherein at least one compound containing chromium is removed from the output solution of step (B), said compound containing chromium in the divalent, trivalent, or hexavalent state wherein the reducing agent of step (C) is reacted with the output solution in at least a stoichiometric amount of the amount required to react with the chromate values present in the output solutions at a temperature of about 50° C. to about 100° C. and a pH of about 4.0 to about 6.5.

3. The process of claim 2 wherein the input solution of step (A) contains bichromate compounds and the reducing agent is selected from the group consisting of hydroxylamine, hydroxylamine sulfate, hydroxylamine formate, and hydroxylamine hydrochloride and wherein the chromate values are removed from the output solution of step (B) by filtration.

4. The process of claim 3 wherein the bichromate compounds are present as sodium bichromate dihydrate at a concentration of about 0.1 to about 20 grams per liter, the treated solution of step (C) contains sodium chlorate in the amount of about 100 grams per liter to about 750 grams per liter, and the removed chromate values contain about 5 parts per million or less of chromium ion.

5. The process of claim 4 wherein step (C) is conducted at a reaction temperature of about 70° C. to about 95° C. and a pH of about 5.0 to about 5.5.

6. The process of claim 4 wherein the reducing agent is hydroxylamine sulfate.

7. The process of claim 6 wherein the reducing agent is present in the amount of at least 2 mols of the reducing agent to 1 mol of the bichromate ions.

8. The process of claim 4 wherein the reducing agent is hydroxylamine.

9. The process of claim 4 wherein the reducing agent is hydroxylamine hydrochloride.

10. The process of claim 4 wherein the reducing agent is hydroxylamine formate.

11. The process of claim 2 wherein the by-products produced in step (E) of claim 1 are converted to the reusable solution of an alkali metal chlorate or an alkaline earth metal chlorate by the process comprising
   (A) converting the by-products to a mixture comprising water and an alkali metal or alkaline earth metal hypochlorite, carbonate, and chloride, thereafter,
   (B) reacting the mixture produced in step (A) counter-currently to a gas mixture comprising an acid gas to produce a mixture comprising an alkali metal or alkaline earth metal hypochlorite, carbonate, and hydroxide and venting gases comprising carbon dioxide from the second scrubbing zone, thereafter,
   (C) reacting the mixture produced in step (B) at an elevated temperature together with an acid or acid gas in a first reaction zone and successively reacting the mixture at elevated temperature in at least a second reaction zone to produce effluent gases comprising an acid gas and carbon dioxide which are recycled to step (B) and, thereafter,
   (D) recovering the reusable solution of the alkali metal chlorite or the alkaline earth metal chlorate.

12. The process of claim 11 wherein said acid gas comprises chlorine.

13. The process of claim 12 wherein the by-products produced in step (E) of claim 1 are converted to the mixture produced in step (A) of claim 12 by passing the by-products dissolved in water counter-currently to an alkali metal hydroxide or an alkaline earth metal hydroxide dissolved in water.

14. The process of claim 13 wherein claim 11 step (C) includes a reaction conducted in a third reaction zone.

15. The process of claim 14 wherein the effluent gases produced in claim 11 step (C) comprise carbon dioxide, chlorine, and water vapor.

16. The process of claim 15 wherein the mixture of claim 11 step (C) is reacted at a temperature of about 60° C. to about 105° C.

17. The process of claim 16 wherein the reaction in the third reaction zone of claim 35 is conducted at a pH of about 5 to about 8.5.

18. The process of claim 17 wherein the pH in the second reaction zone is maintained so as to achieve a pH of about 5 to about 7 in the third reaction zone by controlling the amount of chlorine admitted to the first reaction zone and the alkali metal or alkaline earth metal chlorate is withdrawn from the third reaction zone.

19. The process of claim 18 wherein the alkali metal is sodium.

20. A process for producing chlorine dioxide comprising the steps of:
(A) charging an electrolytic cell having an anode and a cathode with an input solution containing chromate values and sodium chloride dissolved in water;
(B) electrolyzing the input solution in the cell to produce an output solution containing the chromate values and sodium chlorate;
(C) removing the chromate values from the output solution to obtain a treated solution which is substantially free of chromate values containing about 10 parts per million or less of total chromium ions by reacting the output solution with hydroxylamine sulfate at a pH of about 5.0 to about 5.5 and at a temperature of about 70° C. to about 95° C.;
(D) recycling the chromate values removed by inclusion in the input solution of step (A);
(E) passing the treated solution of step (C) to a chlorine dioxide generator and producing chlorine dioxide and by-products from the treated solution;
(F) converting the by-products to substantially chlorine-free carbon dioxide and a reusable solution of sodium chlorate in water;
(G) venting the carbon dioxide and recycling the reusable solution of sodium chlorate by inclusion in the input solution of step (A)
wherein the by-products of step (F) are converted to carbon dioxide and the reusable solution of sodium chlorate in water by reacting the by-products successively with sodium hydroxide dissolved in water and with chlorine gas followed by reaction with chlorine at a temperature of about 60° C. to about 105° C. and a pH of about 5 to about 7 and
wherein the chromate values charged to the electrolytic cell in step (A) are present in a compound containing chromium in the divalent, trivalent, or hexavalent state.

* * * * *

UNITED STATES PATENT AND TRADEMARK OFFICE
CERTIFICATE OF CORRECTION

PATENT NO. : 5,294,307
DATED : March 15, 1994
INVENTOR(S) : John Robert Jackson

It is certified that error appears in the above-indentified patent and that said Letters Patent is hereby corrected as shown below: ON THE TITLE PAGE:

Abstract page, column 1, [*]Notice: The portion of the term of this patent subsequent to May 18, 2010 has been disclaimed--.

Column 7, line 36, the formula for the sodium bichromate dihydrate is inaccurate as not including the period in the center of the line separating the two molecules of water of hydration from the remainder of the formula.

Column 11, line 42 "affluent" should be "effluent".

Column 22, line 60, the reference to "claim 12" should be "claim 11".

Column 23, line 5, "claim 35" should be "claim 14".

Signed and Sealed this

Twenty-first Day of March, 1995

Attest:

BRUCE LEHMAN

Attesting Officer

Commissioner of Patents and Trademarks